(12) United States Patent
Kim et al.

(10) Patent No.: US 10,009,785 B2
(45) Date of Patent: Jun. 26, 2018

(54) METHOD AND APPARATUS FOR CARRYING OUT MEASUREMENT REPORT IN WIRELESS COMMUNICATION SYSTEM

(71) Applicant: LG ELECTRONICS INC., Seoul (KR)

(72) Inventors: Kijun Kim, Anyang-si (KR); Illsoo Sohn, Anyang-si (KR); Hanbyul Seo, Anyang-si (KR); Byounghoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 14/383,466

(22) PCT Filed: Mar. 5, 2013

(86) PCT No.: PCT/KR2013/001742
§ 371 (c)(1),
(2) Date: Sep. 5, 2014

(87) PCT Pub. No.: WO2013/133596
PCT Pub. Date: Sep. 12, 2013

(65) Prior Publication Data
US 2015/0036612 A1 Feb. 5, 2015

Related U.S. Application Data

(60) Provisional application No. 61/606,939, filed on Mar. 5, 2012, provisional application No. 61/610,455, filed
(Continued)

(51) Int. Cl.
*H04W 24/10* (2009.01)
*H04B 17/00* (2015.01)
(Continued)

(52) U.S. Cl.
CPC ............ *H04W 24/10* (2013.01); *H04B 7/024* (2013.01); *H04B 7/0626* (2013.01); *H04B 17/00* (2013.01);
(Continued)

(58) Field of Classification Search
CPC ..... H04B 7/024; H04B 17/318; H04L 5/0035; H04L 5/005
See application file for complete search history.

(56) References Cited

U.S. PATENT DOCUMENTS

| 2012/0028665 A1* | 2/2012 | Kwon | H04L 1/0002 |
| | | | 455/501 |
| 2012/0051451 A1* | 3/2012 | Kwon | H04L 5/0053 |
| | | | 375/285 |

(Continued)

FOREIGN PATENT DOCUMENTS

| KR | 10-2011-0011508 A | 2/2011 |
| WO | WO 2011/100676 A1 | 8/2011 |

(Continued)

OTHER PUBLICATIONS

Ericsson et al., "Use of CSI-RS for CoMP Measurement Set Management," 3GPP TSG-RAN WG1 #68, Feb. 6-10, 2012, 3 pages, R1-120786.

*Primary Examiner* — Hassan Kizou
*Assistant Examiner* — Deepa Belur
(74) *Attorney, Agent, or Firm* — Birch, Stewart, Kolasch & Birch, LLP

(57) ABSTRACT

One embodiment of the present invention relates to a method for a terminal carrying out a measurement report in a wireless communication system, and more particularly, to a method for carrying out a measurement report comprising the steps of: receiving a plurality of CSI-RSs which are included in a first set and/or a second set; determining a CSI-RS that is determined and/or a measurement report on
(Continued)

the CSI-RS which is included in the second set, wherein the triggering condition is to be larger than that resulting from applying a predetermined offset to a reception quality value of the specific CSI-RS from the second set.

18 Claims, 12 Drawing Sheets

Related U.S. Application Data on Mar. 13, 2012, provisional application No. 61/653,396, filed on May 30, 2012, provisional application No. 61/654,052, filed on May 31, 2012.

(51) Int. Cl.
| | |
|---|---|
| *H04B 7/024* | (2017.01) |
| *H04B 7/06* | (2006.01) |
| *H04L 5/00* | (2006.01) |
| *H04W 24/08* | (2009.01) |
| *H04W 72/04* | (2009.01) |
| *H04B 17/24* | (2015.01) |
| *H04B 17/318* | (2015.01) |
| *H04B 17/382* | (2015.01) |
| *H04W 88/02* | (2009.01) |
| *H04L 1/20* | (2006.01) |

(52) U.S. Cl.
CPC ........... *H04B 17/24* (2015.01); *H04B 17/318* (2015.01); *H04B 17/382* (2015.01); *H04L 5/005* (2013.01); *H04L 5/0035* (2013.01); *H04W 24/08* (2013.01); *H04W 72/0413* (2013.01); *H04L 1/20* (2013.01); *H04W 88/02* (2013.01)

(56) References Cited

U.S. PATENT DOCUMENTS

| | | | |
|---|---|---|---|
| 2012/0120903 A1 | 5/2012 | Kim et al. | |
| 2012/0182956 A1* | 7/2012 | Liu | H04L 5/001 370/329 |
| 2013/0028182 A1* | 1/2013 | Geirhofer | H04B 7/0626 370/328 |
| 2013/0028217 A1* | 1/2013 | Sumasu | H04J 11/0023 370/329 |
| 2013/0064111 A1* | 3/2013 | Linsky | H04W 52/243 370/252 |
| 2013/0077513 A1* | 3/2013 | Ng | H04B 7/024 370/252 |
| 2013/0094384 A1 | 4/2013 | Park et al. | |
| 2013/0136100 A1 | 5/2013 | Yoon et al. | |
| 2013/0170474 A1* | 7/2013 | Bi | H04W 36/0055 370/332 |
| 2013/0189972 A1* | 7/2013 | Martin | H04W 36/0088 455/423 |
| 2013/0194953 A1* | 8/2013 | Xu | H04W 52/242 370/252 |
| 2013/0196699 A1* | 8/2013 | Davydov | H04L 5/1469 455/500 |
| 2013/0322273 A1* | 12/2013 | Etemad | H04W 24/10 370/252 |
| 2014/0024357 A1* | 1/2014 | Koskinen | H04W 36/0088 455/418 |
| 2014/0211656 A1* | 7/2014 | Hu | H04W 36/0083 370/252 |
| 2014/0219152 A1* | 8/2014 | Anto | H04W 52/08 370/311 |
| 2014/0308905 A1* | 10/2014 | Miao | H04L 5/0023 455/67.11 |
| 2014/0321359 A1* | 10/2014 | Seo | H04L 5/0057 370/328 |
| 2015/0036664 A1* | 2/2015 | Yuk | H04W 36/30 370/332 |
| 2015/0208265 A1* | 7/2015 | Dalsgaard | H04B 17/382 370/252 |
| 2017/0013480 A1* | 1/2017 | Chen | H04W 24/02 |
| 2017/0238323 A1* | 8/2017 | Marinier | H04W 72/06 370/329 |

FOREIGN PATENT DOCUMENTS

| | | |
|---|---|---|
| WO | WO 2011/145886 A2 | 11/2011 |
| WO | WO 2012/021047 A2 | 2/2012 |

* cited by examiner

FIG. 5
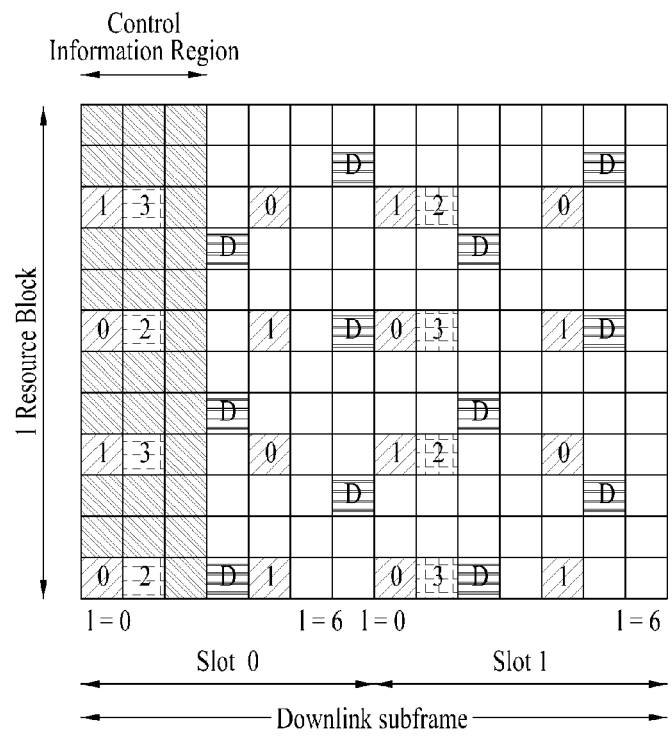
(a)
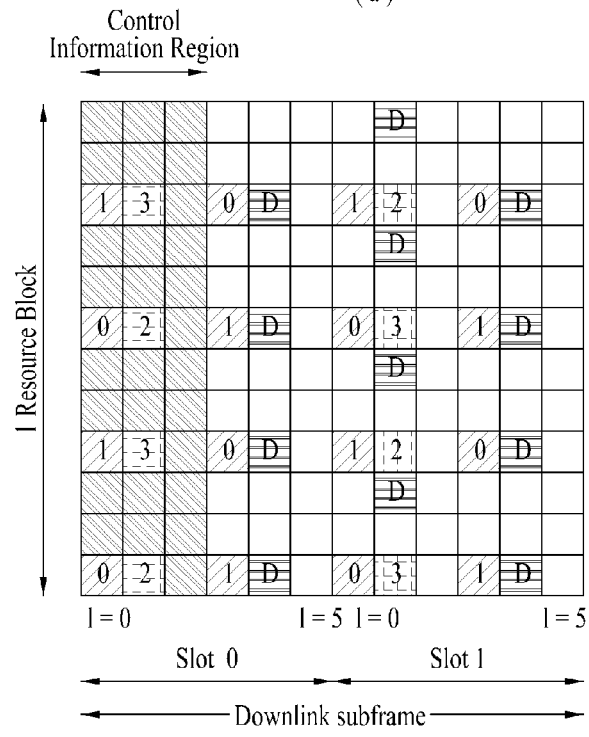
(b)

FIG. 6

METHOD AND APPARATUS FOR CARRYING OUT MEASUREMENT REPORT IN WIRELESS COMMUNICATION SYSTEM

CROSS REFERENCE TO RELATED APPLICATIONS

This application is the National Phase of PCT International Application No. PCT/KR2013/001742, filed on Mar. 5, 2013, which claims priority under 35 U.S.C. 119(e) to U.S. Provisional Application Nos. 61/606,939, filed on Mar. 5, 2012, 61/610,455, filed on Mar. 13, 2012, 61/653,396, filed on May 30, 2012 and 61/654,052, filed on May 31, 2012, all of which are hereby expressly incorporated by reference into the present application.

TECHNICAL FIELD

The present invention relates to a wireless communication system, and more particularly to a method and apparatus for performing measurement report.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide a method for defining various matters such as a triggering condition associated with a measurement report based on various reference signals (RSs).

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for performing a measurement report by a user equipment (UE) in a wireless communication system including: receiving a plurality of channel status information-reference signals (CSI-RSs) contained in at least one of a first set and a second set; determining a CSI-RS satisfying a triggering condition from among one or more CSI-RSs contained in the first set; and reporting at least one of a based on the determined CSI-RS and a measurement result based on a CSI-RS contained in the second set, wherein the triggering condition is 'higher than a specific value obtained when a predetermined offset is applied to a reception (Rx) quality value of a specific CSI-RS of the second set'.

In a second technical aspect of the present invention, a user equipment (UE) device for use in a wireless communication system includes: a reception (Rx) module; and a processor, wherein the processor receives a plurality of channel status information-reference signals (CSI-RSs) contained in at least one of a first set and a second set, determines a CSI-RS satisfying a triggering condition from among one or more CSI-RSs contained in the first set, and reports at least one of a measurement result based on the determined CSI-RS and a measurement result a CSI-RS contained in the second set, wherein the triggering condition is higher than a specific value obtained when a predetermined offset is applied to a reception (Rx) quality value of a specific CSI-RS of the second set.

The first and second technical aspects may include all or some parts of the following items.

The specific CSI-RS may have the best reception (Rx) quality from among one or more CSI-RSs contained in the second set.

Transmission of the measurement report may be continuously performed until the CSI-RS satisfying the triggering condition is contained in the second set.

Transmission of the measurement report may be continuously performed until the number of transmission actions arrives at a predetermined maximum number of transmission actions.

The triggering condition may be valid only when the number of CSI-RSs contained in the second set is less than a predetermined maximum number.

The first set may be a CoMP management set including CSI-RSs configured not to be reported, and the second set may be a CoMP measurement set including CSI-RSs configured to be reported.

The measurement result may be a ratio of an average reception (Rx) power of a CSI-RS transmitted in a serving cell to an average reception (Rx) power of each CSI-RS reporting the measurement result.

If two antenna ports are configured to be used for the measurement report, the average reception (Rx) power may be the sum of reference signal (RS) reception (Rx) powers of the respective antenna ports.

The cells transmitting CSI-RS contained in the first set may form a single CoMP cluster.

The UE may receive cell identifiers (IDs) of cells contained in the remaining CoMP clusters other than the CoMP cluster including a serving cell from a cell of the CoMP cluster including the serving cell.

Data is not transmitted via a resource element (RE) of a CSI-RS transmitted from cells contained in the CoMP cluster.

The triggering condition may be applied only to the CoMP cluster including the serving cell of the user equipment (UE).

Individual cells configured to transmit the plurality of CSI-RSs may have the same cell IDs.

Advantageous Effects

As is apparent from the above description, the embodiments of the present invention can efficiently perform a measurement report through a channel status information reference signal (CSI-RS) in various network environments including a Coordinated Multi-Point (CoMP) environment.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 5 is a conceptual diagram illustrating a reference signal (RS).

FIG. 6 is a conceptual diagram illustrating a channel state information-reference signal (CSI-RS).

BEST MODE

Figure 1:
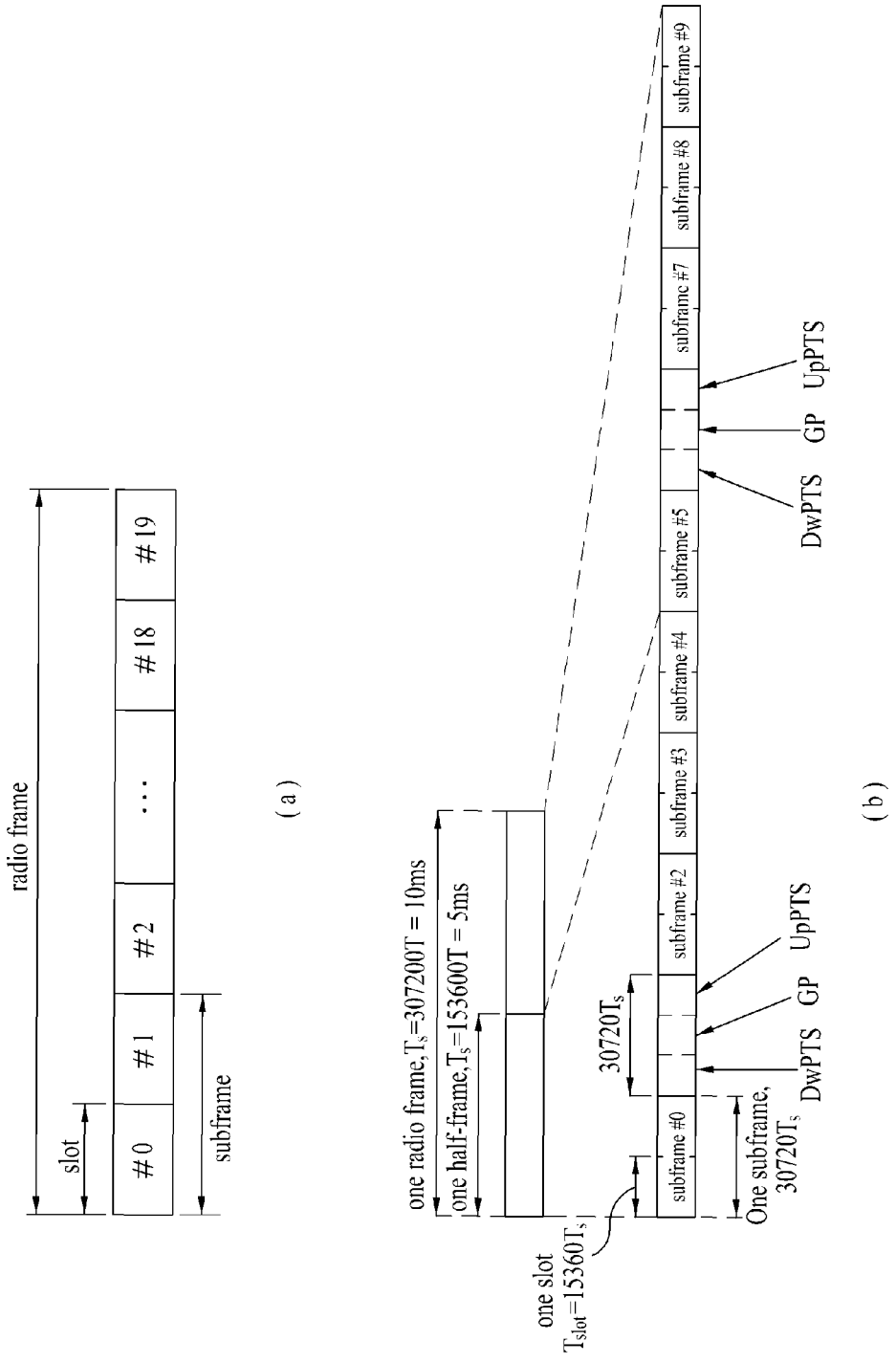
FIG. 1 exemplarily shows a downlink radio frame structure.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

In this specification, embodiments of the present invention are described centering on the data transmission/reception relations between an eNode B and a user equipment. In this case, an eNode B has a meaning of a terminal node of a network directly communicating with a user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other network nodes except the eNode B. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like. The term "cell" may be understood as a base station (BS or eNB), a sector, a Remote Radio Head (RRH), a relay, etc. and may be a comprehensive term capable of identifying a component carrier (CC) at a specific transmission/reception (Tx/Rx) point.

Specific terminologies used in the following description are provided to help understand the present invention and the use of the specific terminologies can be modified into a different form in a range of not deviating from the technical idea of the present invention. Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

LTE/LTE-A Reference Structure/Channel

A structure of a radio frame is explained with reference to FIG. 1.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1(a) is a diagram for a structure of a type 1 radio frame. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1(b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink. Meanwhile, one subframe includes 2 slots irrespective of a type of a radio frame.

The above-described structures of the radio frame are exemplary only. And, the number of subframes included in a radio frame, the number of slots included in the subframe and the number of symbols included in the slot may be modified in various ways.

Figure 2:
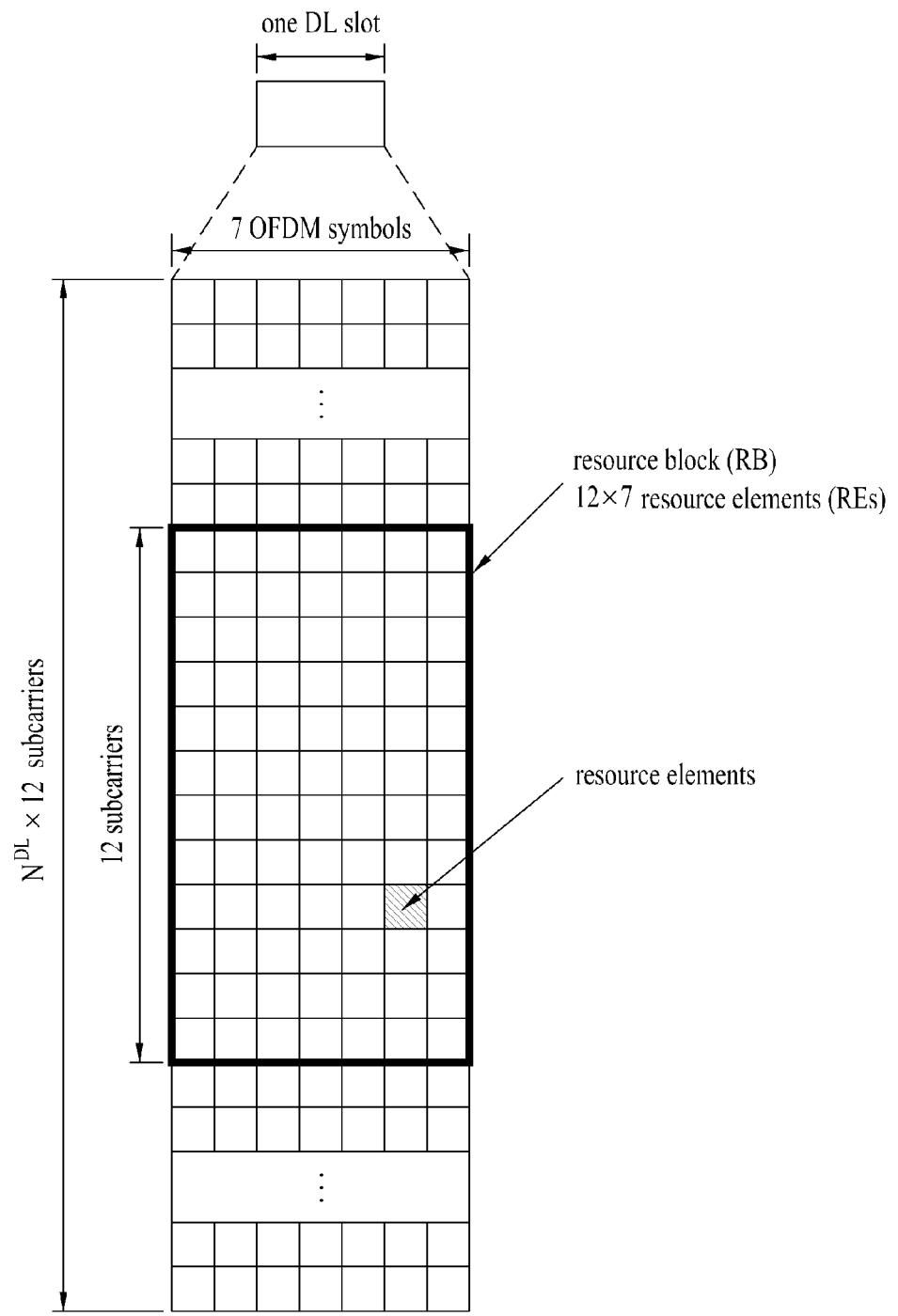
FIG. 2 exemplarily shows a resource grid of one downlink slot.

FIG. 2 is a diagram for a resource grid in a downlink slot. Referring to FIG. 2, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
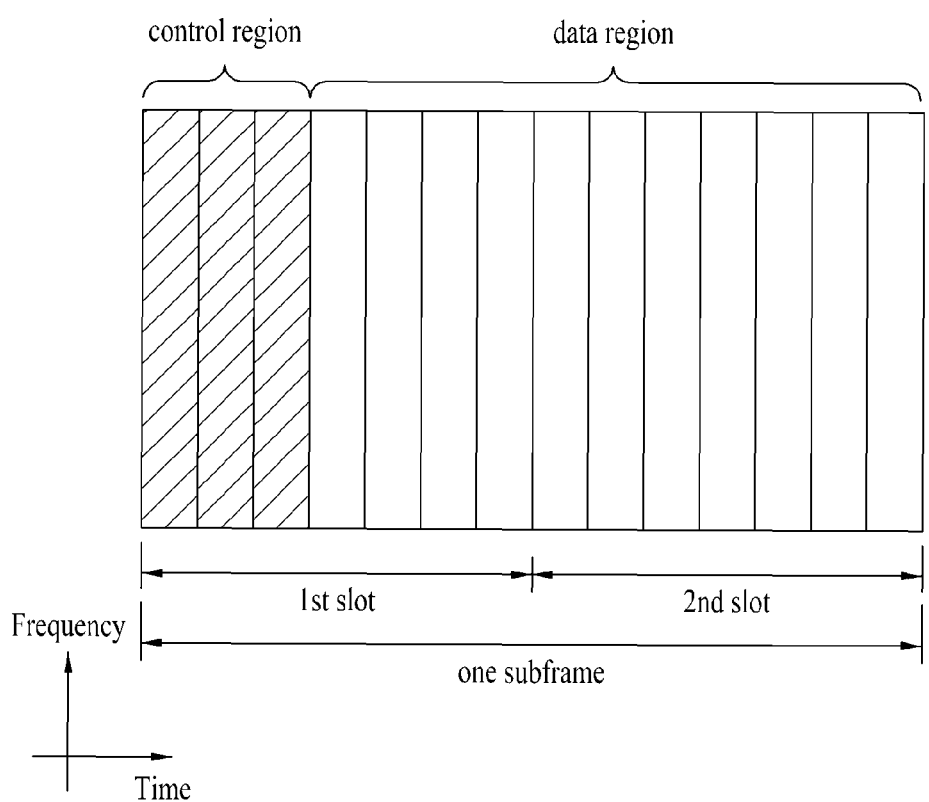
FIG. 3 exemplarily shows a downlink subframe structure.

FIG. 3 is a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. Control information carried on PDCCH may be called downlink control information (hereinafter abbreviated DCI). The DCI may include UL scheduling information, DL scheduling information or a UL transmit (Tx) power control command for a random UE (user equipment) group. PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier)) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI)). In order to indicate a random access response that is a response to a transmission of a random access preamble of a user equipment, CRC can be masked with RA-RNTI (random access-RNTI).

Figure 4:
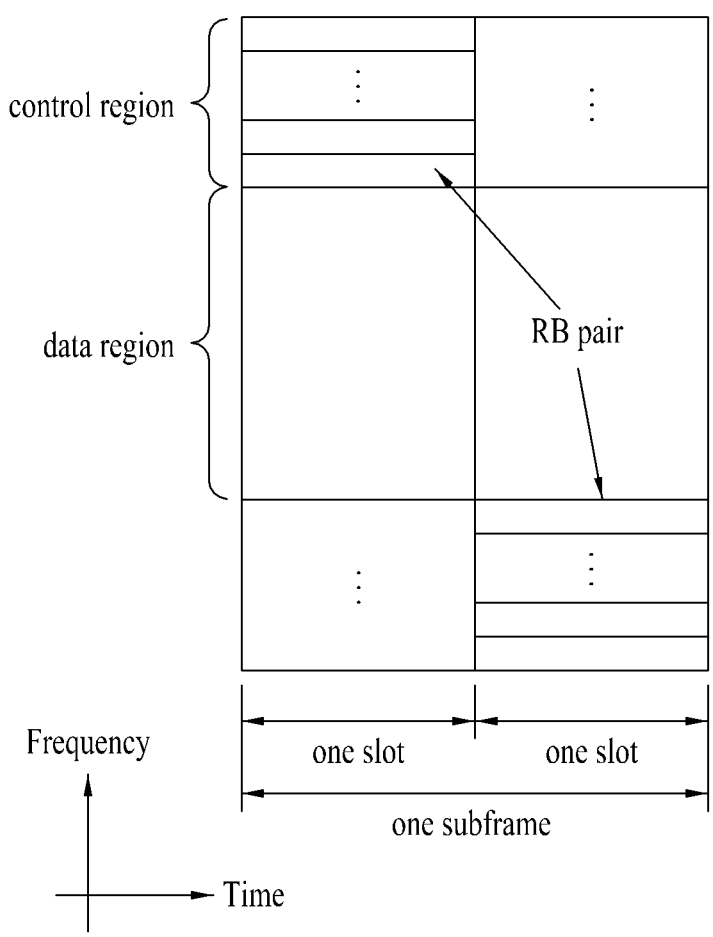
FIG. 4 exemplarily shows an uplink subframe structure.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

Reference Signal (RS)

When packets are transmitted in a wireless communication system, since the transmitted packets are transmitted via a radio channel, signal distortion may occur in a transmission process. In order to enable a receiver to accurately receive the distorted signal, distortion of the received signal should be corrected using channel information. In order to detect the channel information, a method of transmitting a signal which is known to a transmitter and a receiver and detecting channel information using a distortion degree when the signal is received via the channel is mainly used. The signal is referred to as a pilot signal or a reference signal.

If data is transmitted and received using multiple antennas, a channel state between each transmission antenna and each reception antenna should be known in order to accurately receive a signal. Accordingly, a reference signal is present per transmission antenna and, more particularly, per antenna port.

The reference signal may be divided into an uplink reference signal and a downlink reference signal. In a current LTE system, the uplink reference signal includes:

i) a demodulation reference signal (DM-RS) for channel estimation for coherent demodulation of information transmitted via a PUSCH and a PUCCH, and ii) a sounding reference signal (SRS) for measuring uplink channel quality of a network at different frequencies at the BS.

The downlink reference signal includes:

i) a cell-specific reference signal (CRS) shared by all UEs in the cell, ii) a UE-specific reference signal for a specific UE, iii) a demodulation-reference signal (DM-RS) transmitted for coherent demodulation if a PDSCH is transmitted, iv) a channel state information-reference signal (CSI-RS) for delivering channel state information (CSI) if a downlink DMRS is transmitted, v) an MBSFN reference signal transmitted for coherent demodulation of a signal transmitted in a multimedia broadcast single frequency network (MBSFN) mode, and vi) a positioning reference signal used to estimate geographical position information of the UE.

The reference signals may be broadly divided into two reference signals according to the purpose thereof. There are a reference signal for acquiring channel information and a reference signal used for data demodulation. Since the former reference signal is used when the UE acquires channel information in downlink, the reference signal is transmitted over a wide band and even a UE which does not receive downlink data in a specific subframe should receive the reference signal. This reference signal is used even in handover. The latter reference signal is sent by the BS along with resources in downlink. The UE receives the reference signal to perform channel measurement and data modulation. This reference signal is transmitted in a region in which data is transmitted.

The CRS is used for two purposes such as channel information acquisition and data demodulation and the UE-specific reference signal is used only for data demodulation. The CRS is transmitted per subframe over a wide band and reference signals for a maximum of four antenna ports are transmitted according to the number of transmit antennas of the base station.

For example, if the number of transmit antennas of the base station is 2, CRSs for antenna ports 0 and 1 are transmitted and, if the number of transmit antennas of the base station is 4, CRSs for antenna ports 0 to 3 are transmitted.

FIG. 5 is a diagram illustrating a pattern in which CRSs and DRSs defined in a legacy 3GPP LTE system (e.g., release-8) are mapped onto resource block (RB) pairs. A downlink RB pair as a mapping unit of a reference signal may be expressed by one subframe on a time axis and 12 subcarriers on a frequency axis. That is, one RB pair has 14 OFDM symbols in case of a normal CP (FIG. 5(a)) and 12 OFDM symbols in case of an extended CP (FIG. 5(b)).

FIG. 5 shows locations of the reference signals on the RB pairs in a system in which the base station supports four transmit antennas. In FIG. 5, resource elements (REs) denoted by "0", "1", "2" and "3" represent the locations of the CRSs for antenna port indices 0, 1, 2 and 3. Meanwhile, the RE denoted by "D" represents the location of the DMRS.

Channel State Information-Reference Signal (CSI-RS)

CSI-RS is an RS used for channel measurement in an LTE-A system supporting up to eight antenna ports on downlink. CSI-RS differs in this aspect from CRS used for both channel measurement and data demodulation and thus, unlike CRSs, it is not necessary to transmit CSI-RSs in every subframe. CSI-RS is used in Mode 9. For data demodulation, DMRS is used.

More specifically, CSI-RSs may be transmitted through 1, 2, 4 or 8 antenna ports. Antenna port 15 may be used for one antenna port, antenna ports 15 and 16 for two antenna ports, antenna ports 15 to 18 for four antenna ports, and antenna ports 15 to 22 for eight antenna ports.

CSI-RSs may be generated by the following equation 1.

$$r_{l,n_s}(m) = \frac{1}{\sqrt{2}}(1 - 2\cdot c(2m)) + j\frac{1}{\sqrt{2}}(1 - 2\cdot c(2m+1)), \quad \text{[Equation 1]}$$

$$m = 0, 1, \ldots, N_{RB}^{max,DL} - 1$$

Where $r_{l,n_s}(m)$ denotes the generated CSI-RSs, $c(i)$ denotes a pseudo-random sequence, $n_s$ is a slot number, $l$ is an OFDM symbol index, and $N_{RB}^{max,DL}$ denotes the maximum number of RBs in a downlink bandwidth.

The CSI-RSs generated by Equation 1 may be mapped to REs on a per-antenna port basis by the following equation 2.

$$a_{k,l}^{(p)} = w_{l''} \cdot r_{l,n_s}(m') \quad \text{[Equation 2]}$$

$$k = k' + 12m +$$

-continued $$l = l' + \begin{cases} -0 & \text{for } p \in \{15, 16\}, \text{normal cyclic prefix} \\ -6 & \text{for } p \in \{17, 18\}, \text{normal cyclic prefix} \\ -1 & \text{for } p \in \{19, 20\}, \text{normal cyclic prefix} \\ -7 & \text{for } p \in \{21, 22\}, \text{normal cyclic prefix} \\ -0 & \text{for } p \in \{15, 16\}, \text{extended cyclic prefix} \\ -3 & \text{for } p \in \{17, 18\}, \text{extended cyclic prefix} \\ -6 & \text{for } p \in \{19, 20\}, \text{extended cyclic prefix} \\ -9 & \text{for } p \in \{21, 22\}, \text{extended cyclic prefix} \end{cases}$$

$$l = l' + \begin{cases} l'' & \text{CSI reference signal configurations } 0-19, \text{ normal cyclic prefix} \\ 2l'' & \text{CSI reference signal configurations } 20-31, \text{ normal cyclic prefix} \\ l'' & \text{CSI reference signal configurations } 0-27, \text{ extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 2, k' and l' may be determined according to CSI-RS configurations as illustrated in [Table 1].

Figure 6:
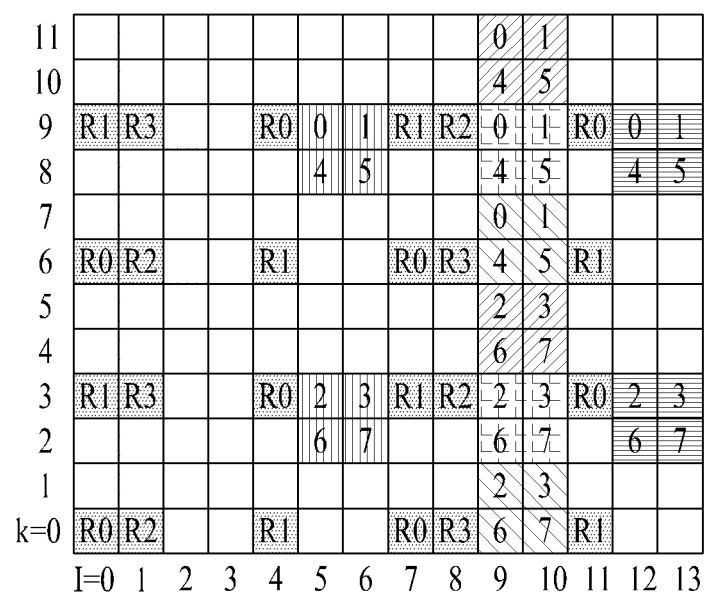

In FIG. 6, CSI-RSs are mapped to REs on a per-antenna port basis according to a specific CSI-RS configuration by Equation 1 and Equation 2. In FIG. 3, R0 to R3 denote that CRSs are mapped to respective antenna ports, and each number represents that CSI-RS is mapped to each antenna port. For example, RE denoted by 0 or 1 may be mapped to CSI-RS corresponding to antenna port 0 or 1. In this case, CSI-RS corresponding to two antenna ports may be mapped to the same RE, and each CSI=RS may be identified by different orthogonal codes.

As described before, CSI-RSs are transmitted in a specific subframe, not in every subframe. Specifically, CSI-RSs may be transmitted in a subframe satisfying the following equation 3, referring to a CSI-RS subframe configuration as illustrated in [Table 2] below.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

$$(10n_f + \lfloor n_s/1 \rfloor - \Delta_{CSI-RS}) \bmod T_{CSI-RS} = 0 \quad \text{[Equation 3]}$$

where $T_{CSI-RS}$ denotes the transmission period of CSI-RSs, $\Delta_{CSI-RS}$ is an offset, $n_f$ is a system frame number, and $n_s$ is a slot number.

TABLE 1

| | | Number of CSI reference signals configured | | | | | |
|---|---|---|---|---|---|---|---|
| | CSI reference | 1 or 2 | | 4 | | 8 | |
| | signal configuration | (k', l') | $n_s$ mod 2 | (k', l') | $n_s$ mod 2 | (k',l') | $n_s$ mod 2 |
| Frame | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

The CSI-RS may be signaled to the UE as a CSI-RS config information element shown in Table 3.

TABLE 3

```
CSI-RS-Config-r10 ::=      SEQUENCE {
    csi-RS-r10                     CHOICE {
        release                        NULL,
        setup                          SEQUENCE {
            antennaPortsCount-r10          ENUMERATED {an1,
an2, an4, an8},
            resourceConfig-r10             INTEGER (0..31),
            subframeConfig-r10             INTEGER (0..154),
            p-C-r10                                INTEGER
(-8..15)
        }
    }                              OPTIONAL,    -- Need ON
    zeroTxPowerCSI-RS-r10      CHOICE {
        release                        NULL,
        setup                          SEQUENCE {
            zeroTxPowerResourceConfigList-r10  BIT STRING (SIZE
(16)),
            zeroTxPowerSubframeConfig-r10  INTEGER (0..154)
        }
    }                              OPTIONAL     -- Need ON
}
```

In Table 3, 'antennaPortsCount-r10' indicates the number of antennas needed for CSI-RS transmission (for example, one, two, four, or eight antennas may be selected), 'resourceConfig-r10' indicates which RE of a single RB is located on time-frequency frequencies, 'subframeConfig-r10' indicates which subframe is used for data transmission, and a CSI-RS EPRE value with respect to PDSCH EPRE is transmitted. In addition, the eNB may further transmit zero power CSI-RS information.

'resourceConfig-r10' contained in 'CSI-RS Config' may indicate a CSI-RS transmission position, and may indicate the positions of symbols and subcarriers contained in one RB according to the CSI-RS configuration numbers (shown in Table 1) denoted by 0 to 31.

Heterogeneous Deployment

Figure 7:
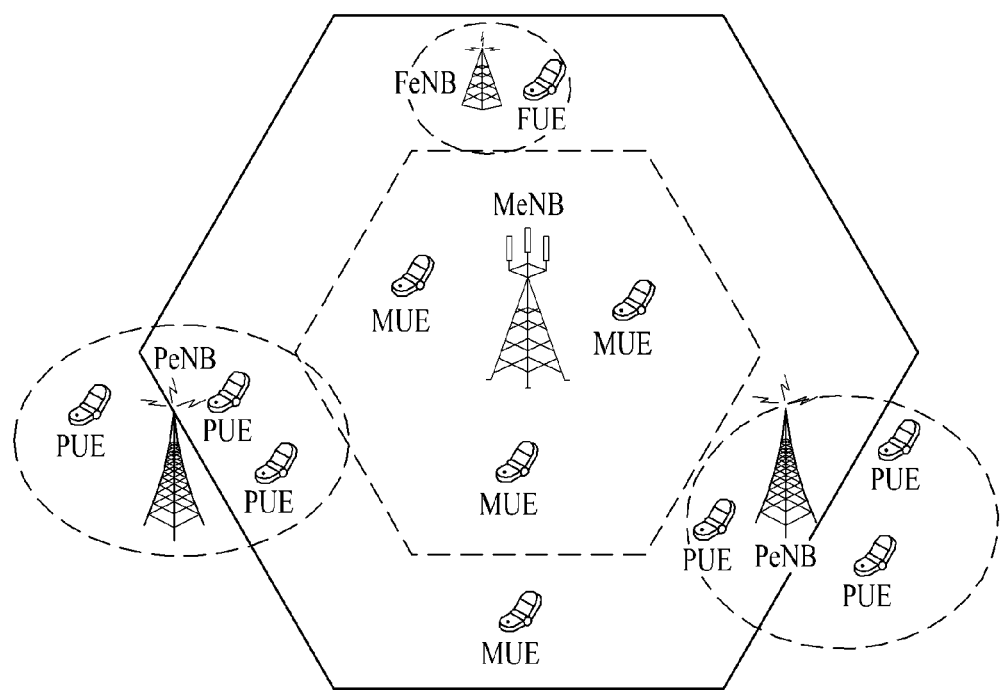
FIG. 7 is a conceptual diagram illustrating a heterogeneous network environment.

FIG. 7 is a heterogeneous network wireless communication system including a macro eNB (MeNB) and a micro eNB (PeNB or FeNB). The term "heterogeneous network" refers to a network in which a macro eNB (MeNB) and a micro eNB (PeNB or FeNB) coexist even though the same Radio Access Technology (RAT) is used.

The macro eNB (MeNB) is a normal eNB having wide coverage and high transmission power in a wireless communication system. The macro eNB (MeNB) may also be referred to as a macro cell.

The micro eNB (PeNB or FeNB) may also be referred to as a micro cell, a pico cell, a femto cell, a home eNB (HeNB), a relay, etc. (MeNB, PeNB and FeNB may also be generically named a transmission point as necessary). The micro eNB (PeNB or FeNB) is a small-sized version of the macro eNB (MeNB), such that the micro eNB (PeNB or FeNB) may independently perform most of the functions of the macro eNB (MeNB). The micro eNB (PeNB or FeNB) may be installed (in an overlay manner) in an area covered by the macro eNB (MeNB) or may be installed (in a non-overlay manner) in a shadow area that cannot be covered by the macro eNB (MeNB). The micro eNB (PeNB or FeNB) has a narrower coverage and lower transmission power and may accommodate a smaller number of user equipments (UEs), compared to the micro eNB (MeNB).

UE, which is hereinafter referred to as a macro UE (MUE), may be directly served by the macro eNB (MeNB).

UE, which is hereinafter referred to as a micro UE (MUE), may be served by the micro eNB (PeNB or FeNB). In some cases, the UE present within the coverage of the micro eNB (MeNB) may be served by the macro eNB (MeNB).

The micro eNB (eNB) may be classified into two types according to access limitations of the UE.

The first type is a Closed Subscriber Group (CSG) or non-Closed Access Subscriber Group (non-CSG) eNB serving as a cell that allows either a legacy macro UE or another micro eNB to access a micro UE. The legacy macro UE (MUE) or the like may be handed over to an OSG-type eNB.

The second type is a CSG eNB that prevents the legacy macro UE or another micro eNB from accessing the micro UE, such that it is impossible to hand over to the CSG eNB.

Coordinated Multi-Point: CoMP

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

A UE can receive data from multi-cell base stations collaboratively using the CoMP system. The base stations can simultaneously support one or more UEs using the same radio frequency resource, improving system performance. Furthermore, a base station may perform space division multiple access (SDMA) on the basis of CSI between the base station and a UE.

In the CoMP system, a serving eNB and one or more collaborative eNBs are connected to a scheduler through a backbone network. The scheduler can operate by receiving channel information about a channel state between each UE and each collaborative eNB, measured by each eNB, through the backbone network. For example, the scheduler can schedule information for collaborative MIMO operation for the serving eNB and one or more collaborative eNBs. That is, the scheduler can directly direct collaborative MIMO operation to each eNB.

As described above, the CoMP system can be regarded as a virtual MIMO system using a group of a plurality of cells. Basically, a communication scheme of MIMO using multiple antennas can be applied to CoMP.

Figure 8:
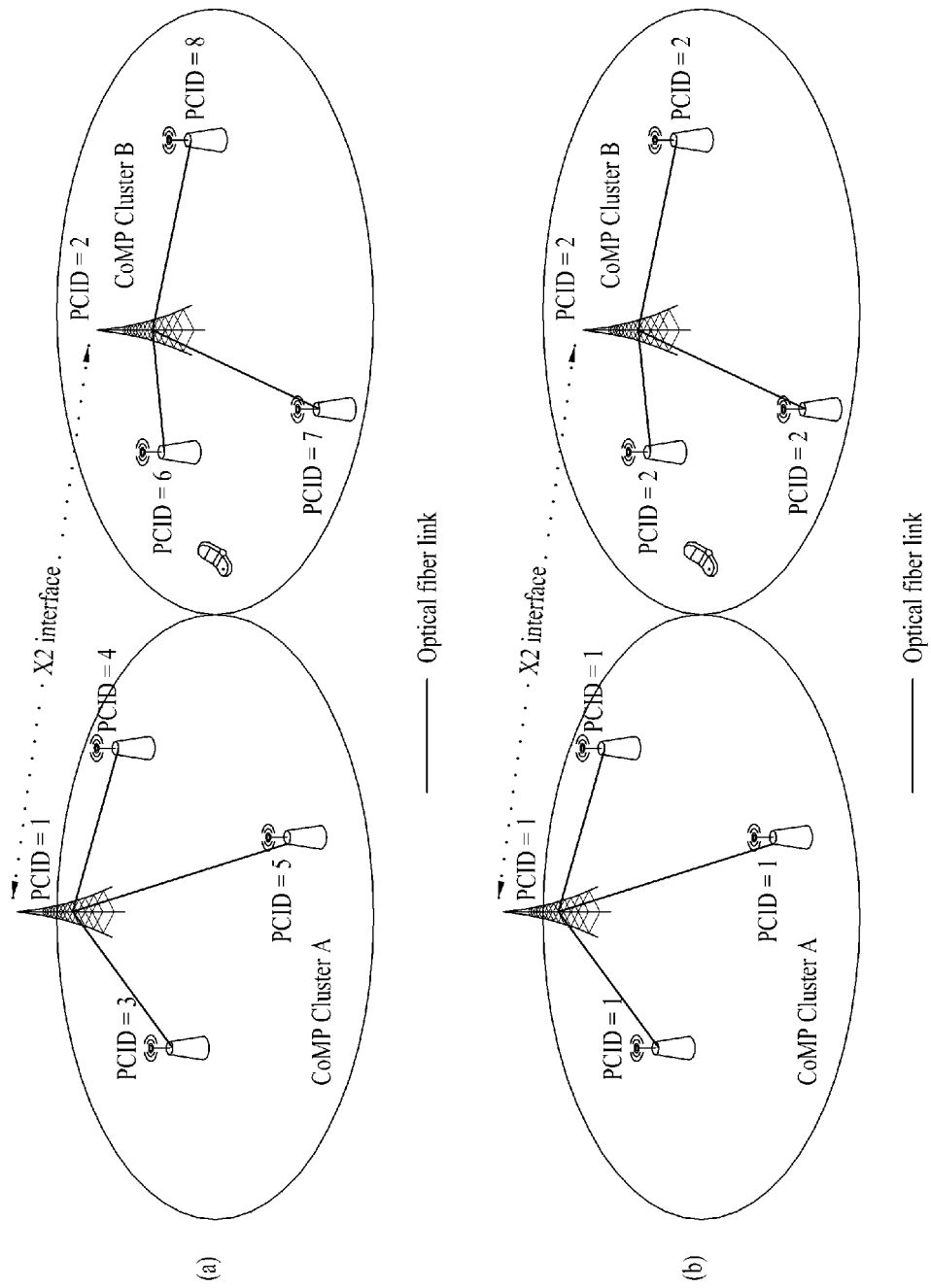
FIG. 8 is a conceptual diagram illustrating exemplary Coordinated Multi-Point (CoMP) clusters to which the embodiments of the present invention can be applied.

FIG. 8 is a conceptual diagram illustrating an example of a Coordinated Multi-Point (CoMP) cluster. Referring to FIG. 8, a CoMP cluster is a CoMP coordination unit. FIG. 8(a) shows an example case in which cells of the CoMP cluster use different physical cell IDs (PCIDs), and FIG. 8(b) shows an exemplary case in which cells of the CoMP cluster use the same PCIDs. For example, although cells of a CoMP cluster use the same PCIDs, individual CoMP clusters (e.g., CoMP clusters A and B of FIG. 8(b)) may be assigned different PCIDs and the cells of a single cluster share the same PCIDs so that the cells may be configured in the form of a distributed antenna or RRH of a single BS. In modified examples of FIG. 8, some cells from among cells of the single cluster may share the same PCIDs.

If the cells share the same PCIDs, various common signals, such as PSS (Primary synchronization signal)/Secondary synchronization signal (SSS), CRS, PBCH, CRS based PDCCH/PDSCH, are transmitted from all cells having the same PCIDs at the same time, so that the common signals can improve reception (Rx) signal quality and remove a shadow region. Alternatively, some cells having high Tx power from among a plurality of cells having the same PCIDs may be configured to transmit common signals, and the remaining cells may not transmit the common signals. However, in case of unicast data transmission through a CSI-RS, a UE-specific RS, and a UE-specific RS based PDSCH, data can be separately transmitted from each cell, resulting in a cell splitting gain.

Measurement/Measurement Report

A measurement report is used in many techniques designed to ensure the mobility of UEs (handover, random access, cell search, etc.) or for one of the techniques. Since the measurement report requires a certain degree of coherent demodulation, a UE may perform measurement after acquiring synchronization and physical layer parameters, except for measurement of received signal strength. The measurement report conceptually covers Radio Resource Management (RRM) measurement of measuring the signal strengths or signal strengths to total reception power of a serving cell and neighbor cells, including Reference Signal Received Power (RSRP), Received Signal Strength Indicator (RSSI), and Reference Signal Received Quality (RSRQ), and Radio Link Monitoring (RLM) measurement of measuring link quality with respect to the serving cell to thereby determine whether a radio link has failed.

RSRP is defined as the linear average over the power contributions of REs that carry downlink CRSs.

RSSI is defined as the linear average of the total received power of a UE. The RSSI is measured from OFDM symbols carrying RSs for antenna port 0, including interference and noise power from neighbor cells. If a specific subframe is indicated for RSRQ measurement by higher-layer signaling, the RSSI is measured over all OFDM symbols of the indicated subframe.

RSRQ is defined as (NxRSRP/RSSI), where N is the number of RBs over the measurement bandwidth of RSSI.

As can be seen from the above-mentioned RSRP definition, it should be premised that measurement reporting is performed using CRS. However, assuming that cells share the same PCID as shown in FIG. 8(b), the cells are unable to discriminate between the cells having the same PCID on the basis of the CRS, such that it is impossible to perform RRM of each cell using only measurement reporting including RSRP/RSRQ based on CRS. Therefore, assuming that cells have the same PCID, it is possible to perform additional RSRP/RSRQ measurement reporting on the basis of independently transmitted CSI-RS. In order to increase reception accuracy during CSI-RS reception of a specific cell, neighbor cells do not transmit signals to a resource element (RE) to which the corresponding CSI-RS is transmitted, such that the neighbor cells can perform higher-accuracy measurement although a frequency of CRS-RS transmission is less than a frequency of CRS transmission. Therefore, although cells have different PCIDs, CRS-based RSRP/RSRQ measurement reporting and CSI-RS RSRP/RSRQ measurement reporting are simultaneously performed, resulting in increased accuracy of network RRM.

Another purpose of CSR-RS transmission in each cell is to perform CSI feedback to be performed by a UE to aid scheduling of a BS (eNB) that determines a rank, precoding matrix, a modulation and coding scheme (MCS) or CQI to be used for DL data transmission between the corresponding cell and the UE. In accordance with the CoMP transmission scheme, the UE must feed back a CSI to a downlink related to a cooperative cell other than the serving cell. An excessive amount of overhead occurs when CSIs of all cells contained in the CoMP cluster including the serving cell are fed back, such that CSIs of some cells (i.e., CoMP measurement set) contained in the CoMP cluster that is valuable in cooperative scheduling and cooperative data transmission can be fed back. Deciding the CoMP measurement set of a specific UE may be configured by selecting cells each having an RSRP of a predetermined level or higher. To achieve the above-mentioned operation, the UE performs RSRP measurement reporting of cells contained in the CoMP cluster including the UE. Alternatively, the BS sets configurations of CSI_RSs each of which will perform RSPR or RSRQ measurement to a CoMP measurement set, and informs the UE of the resultant configurations. The UE may perform RSRP or RSRQ measurement of CSI-RSs transmitted from cells contained in the CoMP management set. If the measurement result satisfies a specific condition, the UE may perform reporting.

In order to implement ICIC between CoMP clusters, a UE performs RSRP measurement and reporting of cells contained in a contiguous CoMP cluster, such that a network and a UE can recognize which one of cells of the contiguous CoMP cluster gives strong interference to the corresponding UE and can also recognize which one of cells receives strong UL interference from the corresponding UE.

In addition to CRS based RSRP/RSRQ measurement reporting for mobility management of UE handover, the CoMP measurement set configuration and the CSI-RS based RSRP/RSRQ measurement reporting for ICIC are simultaneously performed, such that accuracy and flexibility of network RRM can be increased.

Measurement/Measurement Report Decision Reference

Presently, a reference for allowing a user equipment (UE) of the LTE/LTE-A system to perform triggering of a CRS based measurement report will hereinafter be described with reference to the following Table 4.

measurement report may be periodically attempted before the triggering leaving condition is satisfied or before the number of measurement report times arrives at a maximum number of report times.

The measurement report method such as CRS/CSI-RS based measurement report triggering related to the CoMP measurement set configuration according to the embodiments of the present invention will hereinafter be described on the basis of the above-mentioned contents. For convenience of description and better understanding of the present invention, CSI-RS based measurement report triggering, details of CSI-RS based measurement report, application to a plurality of CoMP clusters, and CRS-based measurement report triggering will hereinafter be sequentially disclosed.

Measurement Report Triggering Based on CSI-RS

In the following description, CSI-RS contained in a CoMP measurement set from among CSI-RSs received from cells contained in the serving CoMP cluster is referred to as a feedback CSI-RS, and the remaining CSI-RS other than the CSI-RS is referred to as a non-feedback CSI-RS. Alternatively, the BS designates a plurality of configurations of CSI-RSs to be RSRP/RSRQ-measured as a CoMP management set, and informs the UE of the CoMP management set. A user equipment (UE) assumes that cells contained in the designated CoMP management set configure the CoMP cluster, a CSI-RS contained in the CoMP measurement set is referred to as a feedback CSI-RS, and the remaining CSI-RS is referred to as a non-feedback CSI-RS. For example, as can be seen from FIG. 9, CSI-RSs (#2, #4, #6) contained in the CoMP measurement set from among CSI-RSs (#1~#7) contained in the CoMP management set may be allocated to feedback CSI-RSs, and the remaining CSI-RSs may be allocated to non-feedback CSI-RSs.

Figure 9:
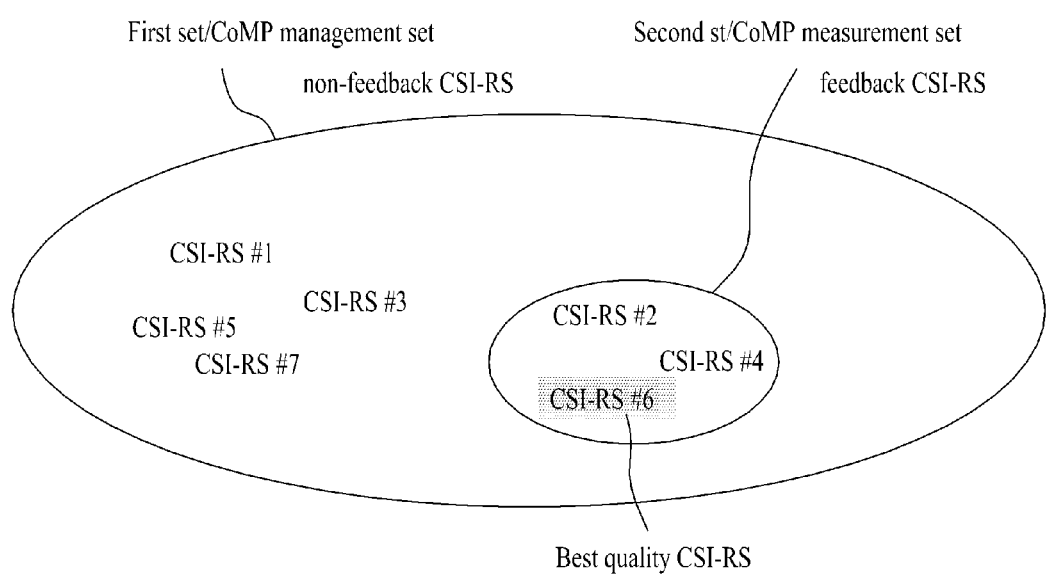
FIGS. 9 and 10 are conceptual diagrams illustrating a measurement report triggering according to the embodiments of the present invention.

Alternatively, the size of a maximum CoMP measurement set may be predefined between the UE and the network. For example, the size of a maximum CoMP measurement set is set to 3 as shown in FIG. 9. In the measurement report triggering according to the embodiments of the present invention, CSI-RS may be added to, removed from, or exchanged with the CoMP measurement set.

TABLE 4

| Event | Triggering Entering condition | Triggering leaving condition |
| --- | --- | --- |
| A1 Serving becomes better than threshold | Ms − Hys > a1Thresh | Ms + Hys < a1Thresh |
| A2 Serving becomes worse than threshold | Ms + Hys < a2Thresh | Ms − Hys > a2Thresh |
| A3 Neighbour becomes offset better than serving | Mn + Ofn + Ocn − Hys > Ms + Ofs + Ocs + a3Off | Mn + Ofn + Ocn + Hys < Ms + Ofs + Ocs + a3Off |
| A4 Neighbour becomes better than threshold | Mn + Ofn + Ocn − Hys > a4Thresh | Mn + Ofn + Ocn + Hys < a4Thresh |
| A5 Serving becomes worse than threshold1 and neighbour becomes better than threshold2 | (Ms + Hys < a5Thresh1) and (Mn + Ofn + Ocn − Hys > a5Thresh2) | (Ms − Hys > a5Thresh1) or (Mn + Ofn + Ocn + Hys > a5Thresh2) |

In Table 4, Ms is the measurement result (RSRP or RSRQ) of a serving cell, Hys is a hysteresis parameter, Mn is the measurement result (RSRP or RSRQ) of a neighbor cell, Ofn is a frequency-specific offset of a frequency of a neighbor cell, Ocn is a cell-specific offset of a neighbor cell, Ofs is a frequency-specific offset of a serving frequency, and Ocs is a cell-specific offset of a serving cell. In Table 4, if the RSRP or RSRQ measurement result of the serving cell and the neighbor cell satisfy each event entering condition, the In accordance with the CSI-RS based measurement report triggering rule, a first rule indicates that 'a non-feedback CSI-RS becomes offset better than best quality CSI-RS from among non-feedback CSI-RSs'. In other words, if the Rx quality value of a specific CSI-RS (If the CoMP measurement set overlaps with one or more CSI-RSs of the CoMP management set, the specific CSI-RS may be CSI-RSs other than the overlap CSI-RSs) contained in the CoMP management set is better than a specific value obtained by applying an offset value to the Rx quality of the best Rx-quality CSI-RS from among CSI-RSs contained in the CoMP measurement set, it can be recognized that this specific CSI-RS satisfies the triggering condition. For example, as shown in FIG. 9, assuming that the best quality CSI-RS from among CSI-RSs contained in the CoMP measurement set is a CSI-RS #6, a reception quality value is 12 dB, and an offset value is 4 dB, some CSI-RSs each having the Rx quality value of 16 dB or higher from among CSI-RSs (CSI-RS #1, CSI-RS #3, CSI-RS #5, CSI-RS #7) contained (only) in the CoMP management set can satisfy the first triggering rule. If the offset value is denoted by −4 dB, CSI-RS each having the Rx quality value of 8 dB or higher from among CSI-RSs contained (only) in the CoMP management set can satisfy the first triggering rule.

According to the first rule, there is a limitation denoted by "Wanted Action" indicating that 'non-feedback CSI-RS is included in the CoMP measurement set'. This means that CSI-RS satisfying the first rule is contained in the CoMP measurement set. If the above-mentioned request operation occurs, the periodic measurement report may be interrupted, and as such a detailed description thereof will be given.

The above-mentioned first rule may not be applied to the exemplary case in which the present CoMP measurement set size is a maximum size. Alternatively, the first rule can also be applied to an exemplary case in which the present CoMP measurement set size is a maximum size and the requested operation may indicate that CSI-RS satisfying the first rule is added to the CoMP measurement set. Alternatively, the first rule may also be applied to the case in which the current CoMP measurement set size is a maximum size, and the requested operation may indicate that CSI-RS satisfying the first rule is added to the CoMP measurement set and a specific CSI-RS contained in the legacy CoMP measurement set is removed. In this case, the removed CSI-RS may have the lowest Rx-quality CSI-RS (or may be reported to have the lowest Rx quality) from among a plurality of CSI-RSs contained in the CoMP measurement set.

A second triggering rule may indicate that 'a feedback CSI-RS becomes offset worse than the best quality CSI-RS from among feedback CSI-RSs'. In other words, if the Rx quality of a specific CSI-RS (If the CoMP measurement set overlaps with one or more CSI-RSs of the CoMP management set, the specific CSI-RS may be CSI-RSs other than the overlap CSI-RSs) contained in the CoMP measurement set is lower than a specific value obtained by applying an offset value to the Rx quality of the best Rx-quality CSI-RS from among CSI-RSs contained in the CoMP measurement set, it can be recognized that this specific CSI-RS satisfies the triggering condition.

In accordance with the above-mentioned second rule, a wanted action indicating that feedback CSI-RS is excluded from the CoMP measurement set may be given. In addition, if the current CoMP measurement set size is set to 1, the second rule may not be used as necessary.

A third rule may indicate that 'a non-feedback CSI-RS becomes offset better than the worst quality CSI-RS from among feedback CSI-RSs'. In other words, if the Rx quality value of a specific CSI-RS contained in the CoMP management set is better than a specific value obtained when an offset value is applied to the lowest Rx quality CSI-RS from among CSI-RSs contained in the CoMP measurement set (wherein, if the CoMP measurement set overlaps with one or more CSI-RSs of the CoMP management set, the specific CSI-RS may be CSI-RSs other than the overlap CSI-RSs), it can be recognized that the specific CSI-RS satisfies the triggering condition.

In accordance with the wanted action of the above third rule, a non-feedback CSI-RS is included in the CoMP measurement set, and the lowest quality feedback CSI-RS is excluded from the CoMP measurement set.

In addition, the third rule can also be applied to the case in which the current CoMP measurement set size is a maximum size.

If the CSI-RS based measurement result of the UE satisfies the above-mentioned triggering condition (i.e., each event entering condition), event report/measurement report for a CSI-RS and a CSI-RS related cell may be attempted. In this case, the event report/measurement report may be periodically attempted, and this attempt may be continuously performed i) before the leaving condition is satisfied, ii) before a current number of reporting actions reaches a maximum reporting number, or iii) before the Wanted Action occurs.

Figure 10:
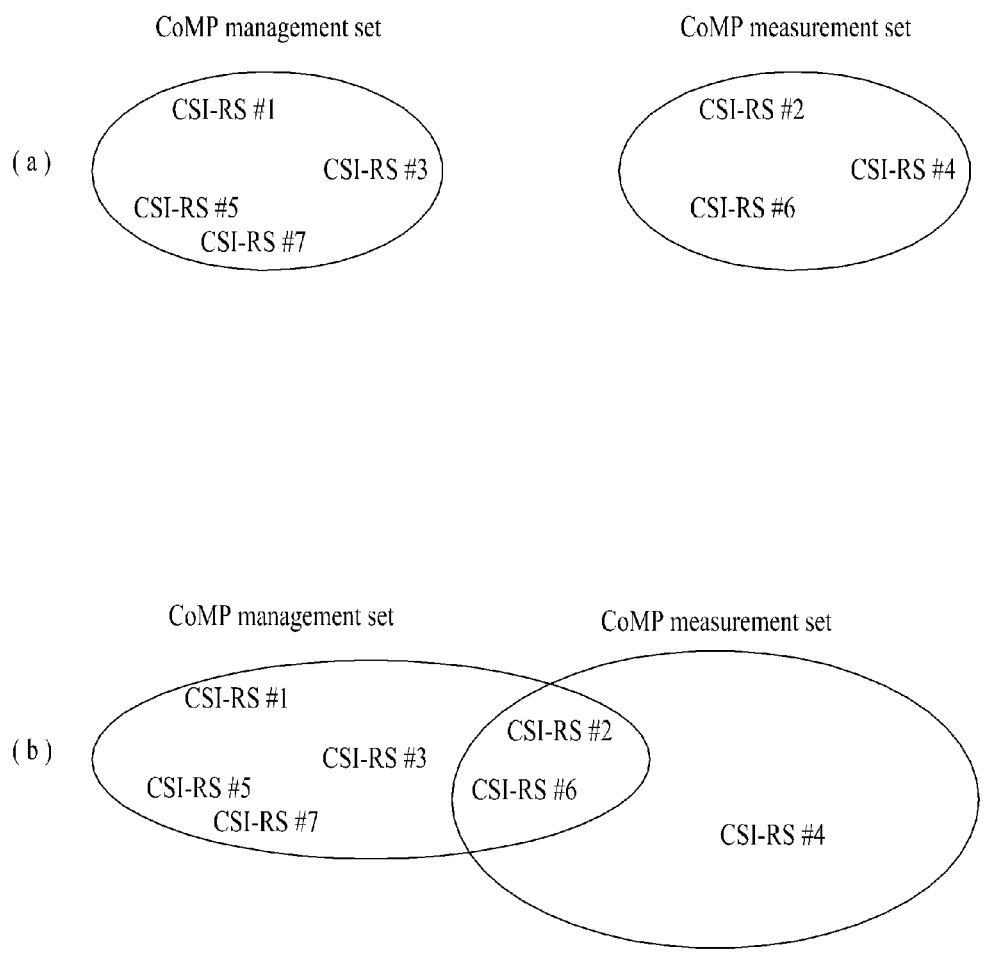

Although the above description has disclosed that the CoMP measurement set is a subset of the CoMP management set for convenience of description and better understanding of the present invention, the above-mentioned description can also be applied to the case in which the CoMP measurement set and the CoMP management set are independently configured and the subset relationship is not formed. In addition, only CSI-RSs that are simultaneously contained in the CoMP measurement set and the CoMP management set are designated as the feedback CSI-RS, and the above-mentioned report triggering rules may also be applied. For example, only CSI-RSs #2 and #6 may be designated as the feedback CSI-RS as shown in FIG. 10(b). A single CSI-RS resource configuration contained in the CoMP measurement set is meaningless in RSRP/RSRQ measurement on the condition that CSI-RS resources transferred from a plurality of Tx points are used for CSI calculation and CSI feedback needed for joint transmission from plural Tx points. For example, if CSI-RS #m includes CSI-RS #n from a Tx point #n and CSI-RS #n+1 from a Tx point #n+1, a CSI-RS #m contained in the CoMP measurement set can be efficiently used to measure a channel status of joint transmission (JT) of the Tx points (#n, #n+1), a channel state of each Tx point may be insufficiently reflected. These CSI-RS resources may be referred to as TP (Tx point)-shared CSI-RS resources. The RSRP measurement result is meaningless though CSI-RS measurement result is meaningful, so that the TP-shared CSI-RSs are not contained in the CoMP management set.

Details of CSI-RS Based Measurement Report

A report value of the CSI-RS based measurement reporting to aid the CoMP measurement set configuration according to the embodiments will hereinafter be described. In the following description, CSI-RS RSRP is defined as Rx power of a reference signal (RS) of a CSI-RS transmission RE. If CSI-RS of the CDM (Code Division Multiplexing)-processed antenna pair is also transmitted, the CSI-RS RSRP may be defined as the sum of Rx powers of CSI-RSs of two antenna ports. It should be noted that the report value of the CSI-RS based measurement report can be applied together with or independently of the CSI-RS based measurement report triggering rules for assisting the CoMP measurement set configuration.

As a report value for CSI-RS based measurement report to help the CoMP measurement set configuration, an average Rx power level from CSI-RS (for example, CSI-RS corresponding to a first configuration/specific location configuration from among multiple CSI-RS configurations) received from the serving cell is measured, and a specific value indicating a difference between an average Rx power level of the remaining CSI-RSs and an average Rx power level of a first CSI-RS can be used.

That is, a measurement report value for the n-th CSI-RS may be defined as the ratio of an average Rx power level of the n-th CSI-RS to an average Rx power level of the first CSI-RS. Alternatively, the measurement report value for the n-th CSI-RS may be defined as the ratio of the average Rx power level of the first CSI-RS to the average Rx power level of the n-th CSI-RS.

RSRP indicating the CRS-based measurement report for the legacy mobility management has the Rx power in units of mW measured by a UE antenna connector, such that this RSRP value may be used as a report value having unnecessary overhead so as to help the CoMP measurement set configuration.

In another embodiment, if CSI-RS having the best average Rx power level is selected from among a plurality of CSI-RSs, the measurement report value for the n-th CSI-RS may be defined as the ratio of the n-th CSI-RS average Rx power level to the best CSI-RS average Rx power level. Alternatively, the measurement report value may also be defined as the ratio of the average Rx power level of the best CSI-RS to the n-th CSI-RS average Rx power level. Since the ratio of power level on a linear scale is defined as a difference in power level on a decibel scale, the above ration of power level (linear value) has the same meaning as a difference in power level (dB value).

In association with the average Rx power level measurement, as a method for measuring the average Rx power level of the CSI-RS transmitted by a specific CSI-RS configuration, the BS or eNB may determine whether all the CSI-RS antenna ports will be used or only a specific antenna port will be used. For example, the BS may determine whether only the first antenna port will be used or only the initial two antenna ports will be used. Although the BS independently designates the number of antenna ports to be used for RSRP measurement according to each CSI-RS configuration, the same number of antenna ports may be used to perform measurement when all CSI-RSs contained in the entire CoMP management set are configured. Alternatively, the average Rx power level may be measured using a first antenna port and a second antenna port when only a specific antenna port (e.g., antenna port #0) is used or when two or more antenna ports are used. All the antenna ports or a plurality of antenna ports for a specific CSI-RS configuration are used for RSRP measurement, and the average Rx power level may be defined as the sum (or average) of average Rx power levels of the individual used antennas.

In another embodiment, if only one antenna port is configured as a CSI-RS configuration, RSRP of the corresponding antenna port is measured and reported. If two or more antenna ports are configured as a CSI-RS configuration, RSRP of a first antenna port and RSRP of a second antenna port are respectively measured so that the sum of RSRP values of two antenna ports can be reported. If CSI-RS transmission actions of different antenna ports share two REs and are distinguished from each other by an orthogonal code, i.e., if RSs of two antenna ports are CDM-processed, Tx power is distributed to two antenna ports.

In another embodiment, if the BS configures only one antenna port through CSI-RS configuration, RSRP of the corresponding antenna port is measured and reported. And if two or more antenna ports are configured as CSI-RS configuration, the sum of RSRP values of two antenna ports being CDM-processed is measured, and the average of the sum of RSRPs of two antenna ports is reported. If four antenna ports are configured, the sum of RSRP values of the first and second antenna ports and the sum of RSRP values of third and fourth antenna ports are reported.

In another embodiment, if the BS configures only one antenna port for CSI-RS configuration, RSRP of the corresponding antenna port is measured and reported. If two or more antenna ports are configured through CSI-RS configuration, i.e., if 2, 4, or 8 antenna ports are configured, the average of RSRP sums of two antenna port pairs being CDM-processed and transmitted is reported. A method for calculating the sum of RSRP values of two antenna ports pairs may be set to any one of i), ii), iii), and iv). In the first method (i), RSRP of the first antenna port is calculated and doubled, so that the sum of RSRP values is defined as the sum of RSRP values of two antenna port pairs. In the second method (ii), RSRP values of the first and second antenna ports are respectively measured, and the sum of RSRP values of two antenna port pairs is defined as the sum of RSRP values of two antenna ports. In the third method (iii), RSRP values of all antenna ports are respectively measured to obtain the average RSRP, and the resultant value is doubled, so that the sum of RSRP values is defined as the sum of RSRP values of two antenna port pairs. In the fourth method (iv), the sum of RSRP values of the CDM-processed antenna port pairs is calculated, and the resultant values are averaged, so that the sum of RSRP values of two antenna port pairs may be defined.

In another embodiment, if only one antenna port is configured as CSI-RS configuration during the CSI-RS reception process, the UE assumes that the CDM-processed antenna port pair is not present, and CSI-RS can be received and detected without despreading. Alternatively, even when only one antenna port is configured as a CSI-RS configuration when the UE receives the CSI-RS, the UE assumes that the CDM-processed antenna port pair not allocated to the UE is present, and the UE can receive and detect the CSI-RS through dispreading.

Since the UE operation is changed by the above two opposing assumptions, which assumption will be used between the UE and the BS may be determined in advance. Alternatively, the BS or eNB may inform the UE of specific information through RRC signaling. The specific information indicates whether the CDM-processed antenna port pair is transmitted through a CSI-RS configuration in which only the corresponding antenna port is established through the above RRC signaling.

If the UE receives signaling information indicating that the CDM-processed antenna port pairs are simultaneously transmitted at a CSI-RS configuration in which only one antenna port is configured, the RSRP value measured when RSRP of the corresponding CSI-RS is reported may be doubled and reported.

In another embodiment, according to a method for measuring the average Rx power level of a CSI-RS transmitted by the CSI-RS configuration, assuming that a Rank-1 precoding matrix is optimally applied to the antenna port set of the corresponding CSI-RS and data is then transmitted, the average Rx power level of the corresponding data channel may be measured. In this case, the Rank-1 precoder may be a precoder of a predetermined codebook or an arbitrary precoder.

When the average Rx power level is calculated, the average Rx power level is corrected in consideration of either the energy ratio of PDSCH EPRE to CSI-RS EPRE configured for each CSI-RS or the power offset parameter of an additional CSI-RS, such that the measurement report may be achieved on the basis of the corrected power level. For example, the average Rx power level of a data channel related to the corresponding CSI-RS may be reported in consideration of the energy ratio of PDSCH EPRE to CSI-RS EPRE. The BS may designate the power offset parameter for each CSI-RS configuration belonging to the CoMP management set, and may inform the UE of the designated power offset parameter. The UE may perform the measurement report on the basis of the corrected power level which is corrected by using the power offset parameter. In addition, the BS may designate a time window needed for averaging. Alternatively, during a predetermined time (e.g., 200 ms or the like), the CSI-RS Rx signal levels are averaged so that the mean Rx power level can be obtained on the basis of the averaged result. Alternatively, the average Rx power obtained from each time window is filtered again, so that the average Rx power level to be reported can be obtained.

The following method may be used as the CSI-RS based measurement report triggering rule for helping the CoMP measurement set configuration. The average Rx power level of the CSI-RS configured as multiple CSI-RS configurations is measured, and the quality of M CSI-RS values each having the best quality can be reported, where M may be predetermined or may be previously designated by the BS through RRC signaling. The UE may periodically report the quality of M CSI-RS values. If there is a change in the list of the selected M CSI-RS values, measurement report may be attempted.

If the CoMP measurement set and the CoMP management set are configured separately from each other, the above-mentioned proposed scheme may be realized as follows by the measurement report triggering scheme that is dependent upon the RSRP measurement result from CSI-RSs contained in the CoMP management set.

The UE may report not only indexes of M CSI-RSs indicating the best RSRP result from among N CSI-RS contained in the CoMP management set, but also the RSRP estimation result of the corresponding CSI-RS. If M CSI-RSs are changed, the report triggering may be performed. In addition, after the above result is reported once to avoid the occurrence of frequent reporting, this reporting may not be performed during a predetermined time (T1). If the reporting is not triggered during a predetermined time (T2), the report triggering may be performed. In this case, N, M, T1, and T2 may be signaled to the UE through RRC signaling.

The above-mentioned scheme is slightly modified, the UE may report not only indexes of a maximum of M CSI-RSs (the RSRP ratio (RSRP_n/max(RSRP_i)) of which is higher than a predetermined threshold value) from among N CSI-RSs contained in the CoMP management set, but also the RSRP estimation result of the corresponding CSI-RS. That is, indexes of a maximum of M CSI_RSs configured to satisfy Equation 4 may be reported.

$$\text{RSRP}\_n/\max(\text{RSRP}\_i) > \text{Threshold} \quad [\text{Equation 4}]$$

Alternatively, not only indexes of a maximum of M CSI-RSs from among a plurality of CSI-RSs (i.e., multiple CSI-RS configurations) from the serving cell, but also the RSRP estimation result of the corresponding CSI-RS may be reported. According to each of the M CSI-RSs, the RSRP ratio (RSRP_n/RSRP_0) with regard to CSI-RS RSRP (RSRP_0) corresponding to a first configuration/specific location configuration among the plurality of CSI-RSs is higher than a predetermined threshold value. That is, a maximum of M CSI-RSs configured to satisfy Equation 5 may be reported.

$$\text{RSRP}\_n/\text{RSRP}\_0 > \text{Threshold} \quad [\text{Equation 5}]$$

Alternatively, indexes of a maximum of M CSI-RSs (wherein the RSRP ratio (CSI-RSRP_n/Serving_CRS_RSRP) with regard to CRS-based RSRP (Serving_CRC_RSRP) of the serving cell which is higher than a predetermined threshold value can be reported along with the RSRP estimation result of the corresponding CSI-RS. That is, a maximum of M CSI-RSs configured to satisfy Equation 6 can be reported.

$$\text{CSI-RSRP}\_n/\text{Serving\_CRC\_RSRP} > \text{Threshold} \quad [\text{Equation 6}]$$

In the above-mentioned description, RSRP to be compared is a corrected RSRP is RSRP to which power offset is reflected, in a method of the BS designates a power offset parameter for each CSI-RS configuration contained in the CoMP management set and then informs the UE of the designated offset parameter. That is, the UE adds the power offset to the measured RSRP[dB] and obtains the corrected RSRP as shown in the following equation 7.

$$\text{Adj\_RSRP}\_i = \text{Meas\_RSRP}\_i + \text{Offset}\_i \quad [\text{Equation 7}]$$

In addition, a Hysteresis parameter (Hy) is added to Equation 7 so as to reduce frequent variation of 'best M RSRP", and RSRP can be corrected as shown in the following equation 8.

$$\text{Adj\_RSRP}\_i = \text{Meas\_RSRP}\_i + \text{Offset}\_i \pm \text{Hy} \quad [\text{Equation 8}]$$

In this case, information as to whether 'Hy' will be added or subtracted can be decided according to whether the corresponding CSI-RS is contained in 'best M CSI-RS' of the previous reporting. If the corresponding CSI-RS is contained in 'best M CSI-RS' of the previous reporting, a bias value is given in a manner that a high Adj_RSRP is realized by addition of Hy, and frequent changing of CSI-RS having 'best M Adj_RSRP' can be reduced or mitigated.

Application to a Plurality of CoMP Clusters

Figure 11:
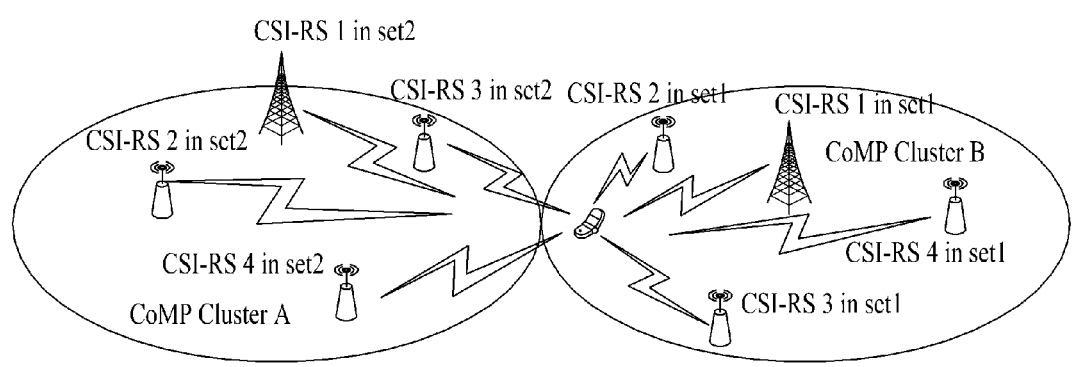
FIG. 11 is a conceptual diagram illustrating a plurality of coordinated multi-point (CoMP) clusters according to the embodiments of the present invention.

Various embodiment to be considered when a plurality of CoMP clusters are present as shown in FIG. 11 will hereinafter be described in detail. That is, multiple CSI-RS resource configurations are classified into a plurality of sets according to unique characteristics, the CSI-RS resource configuration for each set is signaled to the UE, and methods for receiving, detecting, measuring, and managing signals according to the above characteristics will hereinafter be described. In the following description, 'set_1' is a set of CSI-RSs transmitted from the cells contained in the CoMP cluster including the serving cell, and 'set_n(n>1)' is a set of CSI-RSs transmitted from the cells contained in the same CoMP cluster contiguous to the above CoMP cluster.

In association with timing information configured to receive the CSI-RS from a plurality of cells contained in the CoMP cluster, CSI-RSs transmitted from the cells contained in one CoMP cluster are formed as a single CoMP management set, and synchronization signal information for obtaining the Rx time of CSI-RSs contained in the corresponding set may be signaled to each set.

In case of Set_1, the UE may receive and detect CSI-RSs contained in 'set_1" on the basis of the Rx time of signals transferred from the serving cell. In order for the UE to recognize the Rx time of the remaining set_n(n>1), a physical cell ID allocated to cells of the corresponding CoMP cluster may be signaled to the UE. The UE may acquire and maintain the Rx synchronization using PSS/SSS transmitted from the corresponding cell and a CRS on the basis of at least one physical cell ID that represents each set, and the UE may receive and detect CSI_RSs contained in the corresponding set on the basis of the corresponding Rx time.

In association with the relationship of RE mapping to data mapping needed for CSI-RS transmitted from a plurality of cells contained in the CoMP cluster, CSI-RSs transmitted from the cells of one CoMP cluster are formed as a single set, and the CSI measurement set configuration may be limited to a specific CSI-RS resource management set, and the relationship of CSI-RS to RE mapping or the relationship of data to RE mapping may be interpreted by the UE per set in different ways.

The cell contained in the CSI measurement set, i.e., CSI-RS to be measured for CSI feedback, may be composed of only CSI-RSs contained in the same CSI-RS resource configuration set. Alternatively, only CSI-RS contained in 'set_1' may be contained in the CSI measurement set. CSI-RSs contained in 'set_1' may not perform data mapping to the RE through which CSI-RS is transmitted, so that the measurement accuracy of CSI feedback can be improved. That is, the operation in which data is mapped to CSI-RS RE regarding all the multiple CSI-RS resource configurations belonging to 'set_1' is prevented from occurring. In the meantime, data mapping is performed in the case in which CSI-RS of the CSI-RS resource configuration belonging to another set_n(n>1) is mapped to RE. In this case, although zero power CSI-RS resource configuration may be contained in 'set_1', the zero power CSI-RS resource configuration may not be contained in another set_n(n>1).

Alternatively, if coordinated transmission is not achieved between cells located at both ends of the cluster because the CoMP cluster is very large in size, REs to which all CSI-RSs contained in CoMP management set_1 are transmitted need not always to be avoided in data mapping. In this case, information as to whether data mapping for each CSI-RS resource configuration contained in CoMP management set_1 is prevented or not can be separately designated. Alternatively, data mapping may be performed to CSI-RS RE of the CSI-RS resource configuration contained in another set_n(n>1).

Alternatively, in the case of CSI-RSs contained in the CSI measurement set, data is not mapped to an RE through which CSI_RS is transmitted so as to increase the measurement accuracy of CSI feedback, and data is mapped to the RE when other designation information is not present in the corresponding CSI-RS RE contained to the CSI-RS resource management set.

In association with the relationship between the CSI-RS based measurement report triggering and the CoMP cluster, CSI-RSs transmitted from the cells contained in one CoMP cluster is formed as a single set, and the triggering rule of the CSI-RS based measurement report may be differently established for each set. Since only CSI-RSs contained in 'Set_1' belong to the CoMP measurement set, the report triggering rule for helping the CoMP measurement set configuration may be applied only to CSI-RSs contained in 'set_1', and the report triggering rule for the report triggering rule/ICIC management for facilitating the mobility management may be applied only to CSI-RSs contained in the remaining set_n(n>1). In the case of applying the same rule, different parameter values may be assigned to individual sets. For example, according to the report triggering scheme used when the Rx quality of CSI-RS of a neighbor cell is higher than a predetermined threshold value, a threshold value applied to CSI-RSs contained in 'set_1' is different from a threshold value applied to other CSI-RSs contained in the remaining set_n(n>1), and the different threshold values may be signaled to the UE. In addition, when the Rx quality information of CSI-RS contained in 'set_n(n>1)' is reported, the CRS-based measurement report results from one or more cells from among cells having PCIDs representing the corresponding set may be reported at the same time.

Although the above-mentioned description has been disclosed on the basis of LTE/LTE-A systems for convenience of description and better understanding of the present invention, modification thereof may also be applied to other communication standards as necessary. In a communication system configured to transmit a common RS (or a common pilot signal) identified by a cell ID, multiple auxiliary RS configurations are classified into a plurality of sets according to multiple auxiliary RS configurations according to the scheme for transmitting auxiliary RSs to identify individual cells having the same cell ID, and an auxiliary RS configuration for each set may be signaled to the UE, and signals can be received, detected, measured, and managed according to the above characteristics. For example, auxiliary RSs having the same auxiliary RS transmission time form one set, and synch signal information for obtaining the Rx time of auxiliary RSs contained in the corresponding set may be signaled to the UE according to respective sets. In another example, CSI-RSs transmitted from the cells of one CoMP cluster form a single set, and CSI_RS resource configuration may be limited in the CSI-RS set from the remaining CoMP clusters. In more detail, for example, although CSI-RSs contained in 'set_1' may be selected from number of antenna ports (1, 2, 4, 8), the number of antenna ports of CSI-RSs contained in the remaining set_n(n>1) may be set to a predetermined number, for example, 1 or 2.

The above-mentioned description can be extended to other technical fields by forming a plurality of cells in which Tx time synchronization is maintained as a single CoMP cluster, and can also be extended to other technical fields by performing a plurality of CSI-RS resource configurations and measurement reports in a manner that coordinated transmission is achieved between the CoMP clusters. In this case, a plurality of management sets may be signaled to the UE, and the physical cell IDs assigned to cells of the corresponding CoMP cluster may be signaled to at least one UE in such a manner that the CSI-RS reception time can be acquired for each set. The UE acquires reception (Rx) synchronization and maintenance using PSS/SSS and CRS transmitted from the corresponding cell on the basis of the above-mentioned result, and may receive and detect CSI-RSs contained in the corresponding set using the same FFT timing from the corresponding Rx time. That is, the BS classifies CSI-RS resource configuration into a plurality of sets, assigns one or more physical cell IDs to each set, and informs the UE of the assigned result. The UE may acquire reception (Rx) synchronization and maintenance using either PSS/SSS from the corresponding cell or a CRS on the basis of the physical cell IDs designated along with the corresponding set, so that the UE can receive and detect CSI-RSs contained in a specific set. The same FFT timing used when CRS of the corresponding cell is detected is used, so that the UE can receive and detect CSI-RSs contained in the corresponding set.

CRS-Based Measurement Report Triggering

The CRS-based measurement report triggering rule appropriate for the CoMP CSI measurement set structure according to the embodiments of the present invention will hereinafter be described in detail.

According to the principles of an algorithm for deciding cells contained in the CoMP measurement set, the scope of the present invention must be limited to cells of the CoMP cluster to be used for coordinated scheduling or coordinated data transmission in consideration of the CSI feedback overhead. In other words, if the Rx quality (RSRP/RSRQ)

from a specific cell is equal to or higher than a predetermined level, or if the Rx quality of the corresponding cell is less than a predetermined difference as compared to the Rx quality of the serving cell, the corresponding cells may be determined to be cells contained in the CoMP measurement set. For example, if contiguous cells of the CoMP cluster set covering the range of 10 dB or less as compared to the serving-cell RSRP are contained in the CoMP measurement set, if RSRP of the serving cell is denoted by x[dB], and if the contiguous cell RSRP is equal to or higher than (x−10) [dB], the cells must be contained in the CoMP measurement set, so that the measurement report must be triggered when a contiguous cells satisfying the above condition is discovered.

The report triggering rule proposed for helping the CoMP measurement set configuration is shown in the following Table 5.

TABLE 5

| | Event | Triggering Condition |
|---|---|---|
| C1 | Neighbour becomes offset better than serving | $Mn + Ofn + Ocn - Hys > Ms + Ofs + Ocs + c1Off$ |
| C2 | Neighbour becomes offset worse than serving | $Mn + Ofn + Ocn + Hys < Ms + Ofs + Ocs + c2Off$ |
| C3 | Neighbour becomes better than threshold | $Mn + Ofn + Ocn - Hys > c3Thresh$ |
| C4 | Neighbour becomes worse than threshold | $Mn + Ofn + Ocn + Hys < c4Thresh$ |

In Table 5, Ms is the measurement result (RSRP or RSRQ) of a serving cell, Hys is a hysteresis parameter, Mn is the measurement result (RSRP or RSRQ) of a neighbor cell, Ofn is a frequency-specific offset of a frequency of a neighbor cell, Ocn is a cell-specific offset of a neighbor cell, Ofs is a frequency-specific offset of a serving frequency, and Ocs is a cell-specific offset of a serving cell. If the cells configured to perform coordinated cells have the same carrier frequency, Ofn and Ofs may not be present.

If the relationship between CRS and CSI-RS received from each cell is recognized by the UE, the periodic reporting is performed by an event of the above condition. Upon receiving a command indicating that CSI-RS from the corresponding cell is contained in the CoMP measurement set from the corresponding cell, the report purpose caused by the corresponding event is realized so that periodic reporting may be interrupted.

However, assuming that the UE does not recognize the relationship between CRS and CSI-RS transmitted from each cell on the condition that the cells having the same PCIDs are mixed, it is impossible to recognize whether the report purpose caused by the corresponding event is realized. In order to determine whether the contiguous cell is contained in the CoMP measurement set or is worthwhile to be maintained, if the entering condition is satisfied, as many periodic reporting actions as a predetermined number may be performed as necessary. In this case, the number of reporting transmission times may be different from a maximum report number of the legacy event. In addition, the cells to be contained in the CoMP measurement set are limited to some cells of the same CoMP cluster, so that it is necessary to indicate PCIDs of the cells to which the above condition will be applied. The UE may determine whether the Rx quality of the CRS signal received from the cells having a predetermined PCID satisfies the proposed event rule. That is, the UE may apply the above event rule only to the Rx quality of CRS received from the cells having the designated PCID.

Figure 12:
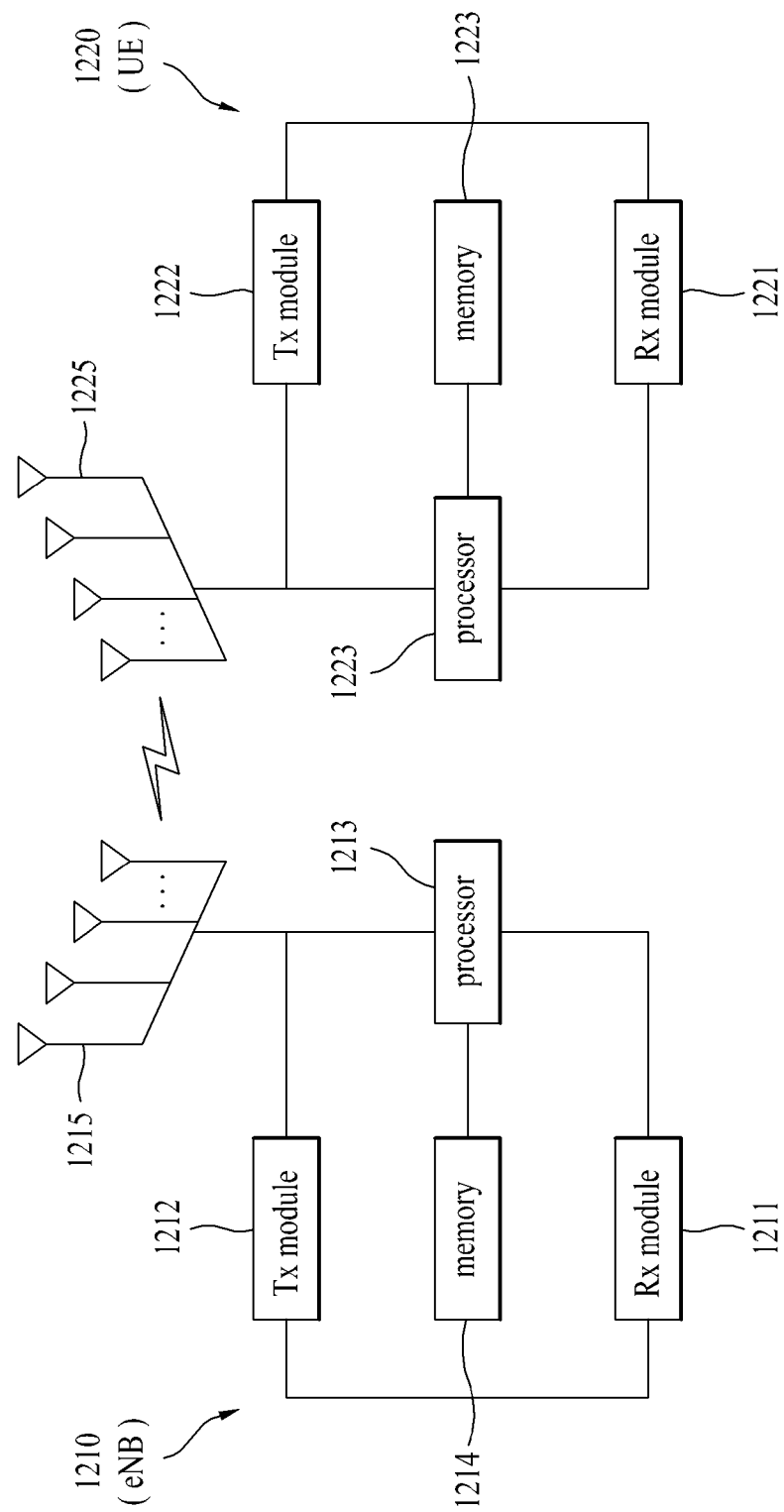
FIG. 12 is a block diagram illustrating a transceiver apparatus applicable to embodiments of the present invention.

FIG. 12 is a block diagram illustrating a BS (eNB) device and a UE device according to the embodiments of the present invention.

Referring to FIG. 12, the BS device 1210 according to the present invention may include a reception (Rx) module 1211, a transmission (Tx) module 1212, a processor 1213, a memory 1214, and a plurality of antennas 1215. The plurality of antennas 1215 indicates a BS device for supporting MIMO transmission and reception. The reception (Rx) module 1211 may receive a variety of signals, data and information on an uplink starting from the UE. The Tx module 1212 may transmit a variety of signals, data and information on a downlink for the UE. The processor 1213 may provide overall control to the BS device 1210.

The processor 1213 of the BS device 1210 according to one embodiment of the present invention can process various operations needed for the above-mentioned embodiments.

The processor 1213 of the BS device 1210 processes information received at the BS device 910 and transmission information to be transmitted externally. The memory 914 may store the processed information for a predetermined time. The memory 1214 may be replaced with a component such as a buffer (not shown).

Referring to FIG. 12, the UE device 1220 may include an Rx module 1221, a Tx module 1222, a processor 1223, a memory 1224, and a plurality of antennas 1225. The plurality of antennas 1225 indicates a UE apparatus supporting MIMO transmission and reception. The Rx module 1221 may receive downlink signals, data and information from the BS (eNB). The Tx module 1222 may transmit uplink signals, data and information to the BS (eNB). The processor 1223 may provide overall control to the UE device 1220.

The processor 1223 of the UE device 1220 according to one embodiment of the present invention can process various operations needed for the above-mentioned embodiments.

The processor 1223 of the UE device 1220 processes information received at the UE device 1220 and transmission information to be transmitted externally. The memory 1224 may store the processed information for a predetermined time. The memory 1224 may be replaced with a component such as a buffer (not shown).

The specific configurations of the BS device and the UE device may be implemented such that the various embodiments of the present invention are performed independently or two or more embodiments of the present invention are performed simultaneously. Redundant matters will not be described herein for clarity.

The description of the BS device 1210 shown in FIG. 12 may be applied to a relay node (RN) acting as a DL transmission entity or UL reception entity without departing from the scope or spirit of the present invention. In addition, the description of the UE device 1220 may be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention can be applied to a variety of mobile communication systems.

The invention claimed is:

1. A method for performing a measurement report by a user equipment (UE) in a wireless communication system, the method comprising:
    receiving at least one of channel status information-reference signals (CSI-RSs) from a first cell having a physical cell identifier (ID);
    determining whether the first cell is a serving cell or a non-serving cell;
    performing different measurements based on whether the first cell is determined to be the serving cell or the non-serving cell; and
    reporting a measurement result message for the at least one of the CSI-RSs,
    wherein the measurement result message includes a measurement result of the at least one of the CSI-RSs together with a measurement result of a cell-specific reference signal (CRS) of the first cell, when the first cell is determined as the non-serving cell.

2. The method according to claim 1, wherein the reporting the measurement result message is performed, when one or more CSI-RSs among the at least one of the CSI-RSs meet a triggering condition.

3. The method according to claim 2, wherein a transmission of the measurement report message is continuously performed until the at least one of the CSI-RSs satisfying the triggering condition is contained in a predetermined set.

4. The method according to claim 1, wherein a transmission of the measurement report message is continuously performed until the number of transmission actions arrives at a predetermined maximum number of transmission actions.

5. The method according to claim 2, wherein the triggering condition is valid only when the number of the at least one of the CSI-RSs contained in a predetermined set is less than a predetermined maximum number.

6. The method according to claim 1, wherein the measurement result of the at least one of the CSI-RSs is a ratio of an average reception (Rx) power of a CSI-RS transmitted from a serving cell to an average Rx power of the at least one of the CSI-RSs reporting the measurement result message.

7. The method according to claim 6, wherein, if two antenna ports are configured to be used for the measurement report, the average Rx power is the sum of reference signal (RS) Rx powers of the respective antenna ports.

8. The method according to claim 2, wherein the UE receives the physical cell ID of the first cell in remaining Coordinated Multi-Point (CoMP) clusters other than a CoMP cluster including the serving cell.

9. The method according to claim 8, wherein data is not transmitted via a resource element (RE) of a CSI-RS transmitted from cells contained in the CoMP cluster.

10. The method according to claim 8, wherein the triggering condition is applied only to the CoMP cluster including the serving cell of the UE.

11. The method according to claim 1, wherein individual cells configured to transmit the at least one of the CSI-RSs have the same cell IDs.

12. A user equipment (UE) device for use in a wireless communication system, the UE device comprising:
    a reception (Rx) module; and
    a processor,
    wherein the processor is configured to:
        receive at least one of channel status information-reference signals (CSI-RSs) from a first cell having a physical cell identifier (ID),
        determine whether the first cell is a serving cell or a non-serving cell,
        perform different measurements based on whether the first cell is determined to be the serving cell or the non-serving cell, and
    wherein the measurement result message includes a measurement result of the at least one of the CSI-RSs together with a measurement result of a cell-specific reference signal (CRS) of the first cell, if the processor determined the first cell as the non-serving cell.

13. The method according to claim 1, wherein independent offset parameters are applied to each of the at least one of the CSI-RSs.

14. The method according to claim 1, wherein the UE uses at least one of a primary synchronization signal (PSS), a secondary synchronization signal (SSS) or the CRS of the first cell when the UE receives the at least one of the CSI-RSs.

15. The method according to claim 1, wherein the measurement result of the CRS of the first cell includes one or more of a reference signal received power (RSRP) and a reference signal received quality (RSRQ).

16. The UE device according to claim 12, wherein independent offset parameters are applied to each of the at least one of the CSI-RSs.

17. The UE device according to claim 12, wherein the processor is further configured to use at least one of a primary synchronization signal (PSS), a secondary synchronization signal (SSS) or the CRS of the first cell when the transceiver receives the at least one of the CSI-RSs.

18. The UE device according to claim 12, wherein the measurement result of the CRS of the first cell includes one or more of a reference signal received power (RSRP) and a reference signal received quality (RSRQ).

* * * * *